(12) United States Patent     (10) Patent No.: US 8,210,475 B2
Burgunder et al.     (45) Date of Patent: Jul. 3, 2012

(54) AIRCRAFT WITH WINDSHIELD GLASS PLATES INTERCHANGEABLE BETWEEN DIFFERENT TYPES

(75) Inventors: Samuel Burgunder, Toulouse (FR); Pascal Chaumel, Plaisance du Touch (FR); Patrick Lieven, Fronton (FR); Christophe Mialhe, Giroussens (FR)

(73) Assignee: Airbus Operations SAS, Toulouse (FR)

( * ) Notice: Subject to any disclaimer, the term of this patent is extended or adjusted under 35 U.S.C. 154(b) by 351 days.

(21) Appl. No.: 12/629,513

(22) Filed: Dec. 2, 2009

(65) Prior Publication Data

US 2010/0163676 A1     Jul. 1, 2010

(30) Foreign Application Priority Data

Dec. 2, 2008 (FR) ...................................... 08 58189

(51) Int. Cl.
    *B64C 1/14*     (2006.01)
(52) U.S. Cl. .................................................. 244/129.3
(58) Field of Classification Search .................. 244/121, 244/129.3, 129.1, 129.4; 114/361; 296/96.21, 296/146.15, 84.1, 190.1; 52/208
See application file for complete search history.

(56) References Cited

U.S. PATENT DOCUMENTS 4,324,373 A     4/1982     Zibritosky

FOREIGN PATENT DOCUMENTS

| EP | 0376190 A2 | 7/1990 |
| EP | 1300333 A1 | 4/2003 |

OTHER PUBLICATIONS

French Search Report dated Jul. 13, 2009.

*Primary Examiner* — Tien Dinh
*Assistant Examiner* — Nicholas McFall
(74) *Attorney, Agent, or Firm* — Perman & Green, LLP

(57) ABSTRACT

An aircraft in which it is possible to replace windshield panes of the mineral type with windshield panes of the organic type and vice versa, without the frame of the aircraft structure having to be modified. The pane is held in place on the frame by a window pane retainer specific to the pane. The frame has no through-holes opening to the outside of the aircraft for fastening the pane. The window pane retainer specific to a pane of the organic type has pins passing through the acrylic panes. The disclosed embodiments also relate to a method of replacing a pane of a first type with a pane of a second type.

4 Claims, 3 Drawing Sheets

AIRCRAFT WITH WINDSHIELD GLASS PLATES INTERCHANGEABLE BETWEEN DIFFERENT TYPES

BACKGROUND

1. Field

The disclosed embodiments relate to aircrafts having a windshield. More particularly, the disclosed embodiments relate to an aircraft in which it is possible to replace windshield panes of the glass type with windshield panes of the acrylic type without the aircraft structure having to be modified.

2. Brief Description of Related Developments

In the aeronautical field, it is known to provide the front part of an aircraft, forming the cockpit in which the pilots sit, with several panes in order for the pilots to have an overall view of events outside the aircraft.

Panes are complex structures having a transparent assembly, a peripheral seal, and optionally additional elements such as deicing elements, demisting elements, etc., for example.

In cockpit panes, the front panes forming the windshield must meet particular strength criteria. The transparent assembly generally consists of several structural and non-structural plies of transparent materials which may be:

materials of mineral origin such as glass, quartz, silica, or combinations thereof, and/or materials of organic origin such as acrylics, polycarbonates or certain resins, or combinations thereof.

The materials and arrangement of the panes are chosen so as to give the panes structural characteristics suitable for the necessary mechanical strength. In particular, a pane must be able to withstand:

variations in pressure and temperature in operation;

impacts of various nature, in particular bird strike, hail; and scratches and abrasion.

The windshield panes are fastened on a frame, in an opening made in the structure of the aircraft cockpit.

Whatever the type of pane chosen, be it mineral or organic, the pane is pinched and clamped, at a peripheral rim, between a first face of the frame and a window pane retainer.

In the specific case of a pane of the mineral type, that is to say in which the plies ensuring structural strength are made essentially of a mineral material, the window pane retainer is moreover held assembled on a second face of the frame by fastening elements. The deformation of the pane is very slight due to the rigidity of the material of the pane. There is no risk of the pane becoming detached from of the window pane retainer-frame assembly, the pinching of the pane between the frame and the window pane retainer thus being sufficient to hold the windshield in place.

In the specific case of a pane of the organic type, that is to say in which the plies ensuring structural strength are made essentially of an organic material, the pane undergoes greater deformation than panes of the mineral type since the material is much less rigid. Variations in pressure or impacts, inter alia, cause a deformation of the pane which could lead to the pane becoming at least partially detached from the window pane retainer-frame assembly if such a pane is mounted just pinched. To hold the pane in place, it is known in the prior art, in order to avoid this risk, and as illustrated in FIG. 1, to clamp the pane 10 between the first face 121 of the frame 12 and the window pane retainer 13 by way of through-fasteners 15. Coaxial through-holes 128, 104, 138 for the fasteners 15 to pass through are made in the frame, the pane of the organic type and the window pane retainer. Said fasteners are, for example, screw-nuts, preferably having a countersunk head outside the aircraft in order to maintain a surface state taking account of the aerodynamic stresses on the aircraft.

In this case, the frame and the window pane retainer are not directly held assembled together by fastening elements.

The architecture of the windshield frames fitted nowadays on aircraft thus depends on the type of pane chosen.

The choice of pane must be determined very early in the aircraft assembly process since the assembling of the structural components of the front part of the aircraft depends on this. It is, namely, difficult and expensive to envisage replacing a windshield frame since the front part is complex from the structural point of view and comprises numerous systems.

SUMMARY

The aspects of the disclosed embodiments aim to improve aircraft maintenance and conversion possibilities.

For this purpose, the disclosed embodiments provide means and a method using said means to modify the type of pane of an aircraft without modifying the frame.

To this end, one aspect of the disclosed embodiments is a method for replacing an aircraft windshield pane of a first, mineral or organic, type, called the first type, which is held in place on a frame of a structure of said aircraft by means of a window pane retainer specific to said first type of pane, with a windshield pane of another, organic or mineral, type, called the second type. The method comprises the steps of:

removing the fastening elements and the window pane retainer holding the pane of the first type in place;

removing the pane of the first type.

According to the disclosed embodiment, the method comprises the subsequent steps of:

placing the pane of the second type in the position of the pane of the first type;

replacing the window pane retainer for the pane of the first type with a window pane retainer specific to the second type; and fastening the window pane retainer of the second type on the frame with fastening elements having the same shape and location as those of the window pane retainer of the first type, one of the window pane retainers having pins passing through the pane of the organic type.

The disclosed embodiments also relate to an aircraft in which at least one windshield pane of the acrylic type is held in place by a window pane retainer fastened to a frame of a structure of said aircraft, said at least one pane being interposed between a first face, called the bearing face, of the frame and a first face of the window pane retainer. According to the disclosed embodiment, the frame has no through-holes opening to the outside of the aircraft for fastening the pane. In addition, the window pane retainer is fastened to the frame by fastening elements, inside the aircraft, passing through the through-holes in the frame, and has pins distributed on the first face, each pin having an elongate shape and engaging in an orifice passing through the pane in a thickness of said pane.

Preferably, to prevent the risk of the acrylic pane becoming detached from the window pane retainer-frame assembly, the pin has a length between a minimum length necessary to hold the pane in the window pane retainer-frame assembly in the event of deformation of the pane and a maximum length such that a first end of the pin, the one closest to the bearing face of the frame, is not in contact with said bearing face of said frame.

In one embodiment, in order to increase the resistance of the pin to the stresses generated by the deformation of the organic pane, the frame has, on the bearing face, a blind hole facing the orifice in the pane for taking one end of the pin.

In one embodiment, the pin and the window pane retainer are produced as one piece.

One embodiment also relates to a window pane retainer for holding a windshield pane of the organic type in place on a frame of an aircraft structure. According to the disclosed embodiment, the window pane retainer has pins distributed on a first face, each pin having an elongate shape and being intended to engage in an orifice passing through the pane in a thickness of said pane.

In one embodiment, the pin and the window pane retainer are produced as one piece.

BRIEF DESCRIPTION OF THE DRAWINGS

The aspects of the disclosed embodiments are described in detail with reference to the figures, in which.

DETAILED DESCRIPTION OF THE DISCLOSED EMBODIMENTS

Figure 1:
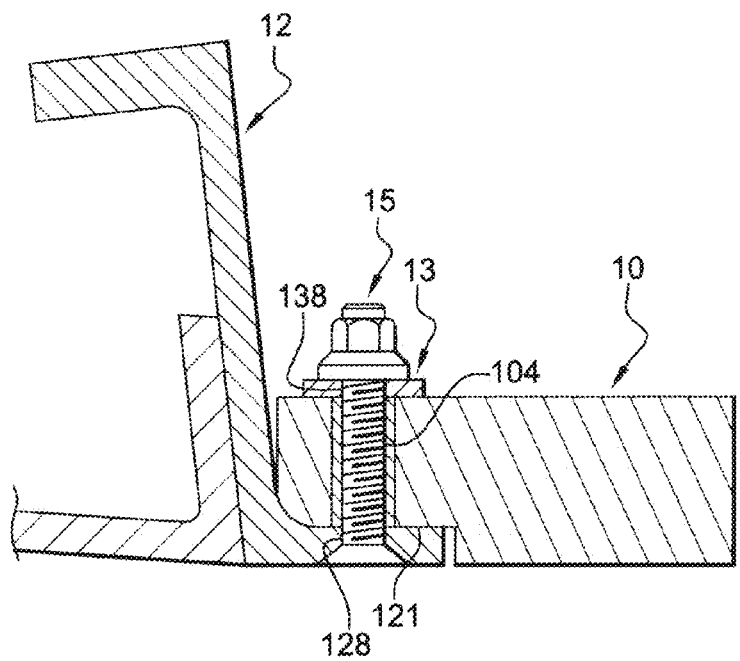
FIG. 1, already mentioned, shows a cross-sectional view of an assembly of a pane of the organic type on an aircraft structure according to the prior art.
Figure 2:
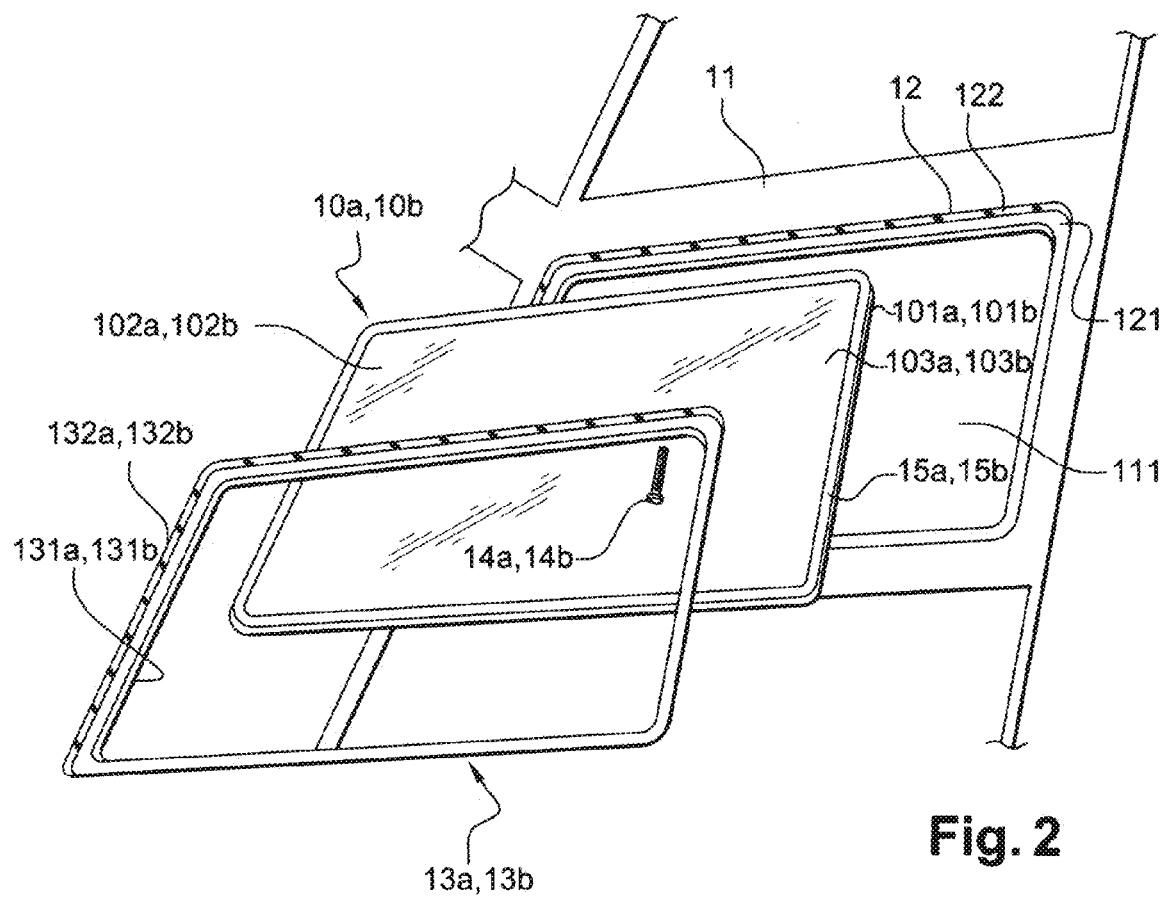
FIG. 2 shows a perspective exploded view of an assembly of a side windshield pane on an aircraft structure, viewed from inside the cockpit of said aircraft.

An aircraft has, as illustrated in FIG. 2, a windshield which comprises at least one pane 10a, 10b positioned in an opening 111 made in a structure 11 of said aircraft and held fastened on a frame 12 of said structure by way of a window pane retainer 13a, 13b.

The aspects of the disclosed embodiments are described and illustrated only for a front windshield pane. However, the aspects of the disclosed embodiments can be applied to any windshield panes that could be produced either from materials of mineral origin or materials of organic origin.

The term pane 10a, 10b is intended to mean a complex structure comprising a transparent assembly 102a, 102b, a peripheral seal 15a, 15b and optionally additional elements such as, for example, deicing or demisting elements (not shown).

A pane is considered here to be an interchangeable element.

The transparent assembly consists of structural plies and non-structural plies.

In the case of a pane of the mineral type, the transparent assembly consists of structural plies essentially of the mineral type, such as glass, for example.

In the case of a pane of the organic type, the transparent assembly consists of structural plies essentially of the organic type, such as for example an acrylic, more particularly a polycarbonate.

In the rest of the description, the term glass pane 10a denotes any pane of the mineral type and the term acrylic pane 10b denotes any pane of the organic type.

The design of the glass pane 10a is identical to that of known glass panes.

The design of the acrylic pane 10b is identical to that of known acrylic panes.

The peripheral seal 15a, 15b, for example a silicone seal, is intended firstly to provide seal between the inside and outside of the aircraft and secondly to protect the material of the pane 10a, 10b while it is clamped between the material of the frame 12 and the window pane retainer 13a, 13b.

The glass pane 10a or acrylic pane 10b has a first face, called the external face 101a, 101b, on the outside of the aircraft and a second face, opposite the external face, called the internal face 103a, 103b, on the inside of the aircraft.

The frame 12 has, substantially parallel to the plies of the pane, a first face, called the bearing face 121, which takes the external face 101a, 101b of the pane 10a, 10b and, substantially perpendicular to the plies of the pane, a second face, called the fastening face 122, directed towards the inside of the cockpit.

Figure 3:
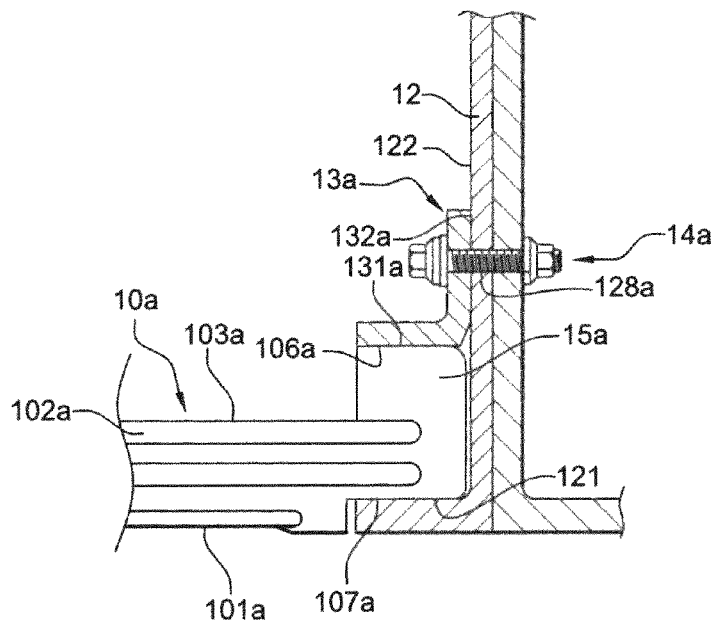
FIG. 3 shows a cross-sectional view of an assembly of a pane of the mineral type on an aircraft structure in accordance with an embodiment.
Figure 4:
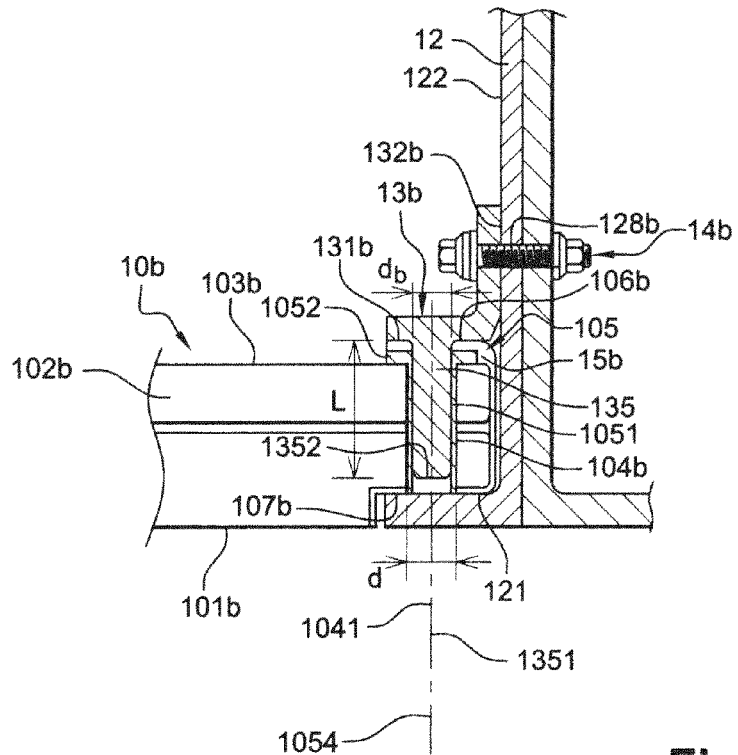
FIG. 4 shows a cross-sectional view of an assembly of a pane of the organic type on an aircraft structure in accordance with an embodiment.

The external face 101a, 101b of the pane 10a, 10b bears with its peripheral surface against the bearing face 121 of the frame 12, said peripheral surface defining a rim, called the external peripheral rim 107a, 107b (FIGS. 3 and 4).

The window pane retainer 13a, 13b has a first face 131a, 131b which rests on the internal face 103a, 103b of the pane 10a, 10b, so as to cover a peripheral surface of the internal face of the pane, said peripheral surface defining a rim, called the internal peripheral rim 106a, 106b (FIGS. 3 and 4).

More precisely, the window pane retainer 13a, 13b is positioned on the frame 12 such that the pane 10a, 10b is pinched peripherally between the bearing face 121 of the frame 12 and the first face 131a, 131b of the window pane retainer 13a, 13b.

The term window pane retainer 13a, 13b is intended to mean a single element which covers the internal peripheral rim 106a, 106b of the pane 10a, 10b or an assembly of elements which covers substantially the entire internal peripheral rim of the pane.

By way of example, FIG. 2 illustrates a single element forming the window pane retainer 13a, 13b.

In accordance with the disclosed embodiment, the frame 12 is designed under the consideration that all the panes, both glass panes 10a and acrylic panes 10b, to be mounted on said frame, either for the first time or as a replacement, are held in place by window pane retainers 13a, 13b fastened to the frame 12 by the fastening face 122. More particularly, the frame 12, on the bearing face 121, has no through-holes opening to the outside of the aircraft for the fasteners which hold the pane in place on the frame to pass through.

In accordance with one aspect of the disclosed embodiments, only the window pane retainer 13a, 13b differs depending on the type of pane 10a, 10b to be mounted on the frame 12 which is invariant.

The term glass window pane retainer 13a denotes the window pane retainer designed for mounting a glass pane 10a on the frame 12 of the aircraft.

The term acrylic window pane retainer 13b denotes the window pane retainer designed for mounting an acrylic pane 10b on the same frame 12 of the aircraft.

FIG. 3 illustrates the mounting of a glass pane with a glass window pane retainer 13a on a frame 12.

FIG. 4 illustrates the mounting of an acrylic pane with an acrylic window pane retainer 13b on the same frame 12.

Whatever the type of pane mounted on the frame, be it a glass pane 10a or an acrylic pane 10b, the window pane retainer 13a, 13b has a second face 132a, 132b, placed facing the frame fastening face 122 and fastened to said fastening face by a plurality of fastening elements 14a, 14b.

On its fastening face 122, the frame 12 has through-holes 128a, 128b for the fastening elements 14a, 14b to pass through.

Advantageously, the glass window pane retainer 13a and the acrylic window pane retainer 13b have dimensions such that one and the same through-hole in the frame 12 takes either a fastening element 14a for fastening the glass window pane retainer to the frame 12 or a fastening element 14b for fastening the acrylic window pane retainer to the frame 12.

Preferably, the fastening elements 14a, 14b are identical in order to assemble the two types of window pane retainers on the frame 12.

The acrylic panes and the glass panes have a substantially different thickness, and the second face of each, glass or acrylic, window pane retainer has a different length to compensate for the differences in thickness between the panes.

To prevent the risk of the acrylic pane becoming detached from the acrylic window pane retainer-frame assembly, the acrylic window pane retainer 13b also has, on the first face 131b, pins 135 distributed in sufficient number on the first face 131b. Each pin has an elongate shape, of length L and axis 1351, and engages in an orifice 104b, of axis 1041 coincident with the axis of the pin, passing through the acrylic pane 10b in a thickness of said pane.

The number of pins is advantageously chosen in order for the pane to withstand the various stresses envisaged.

In a plane perpendicular to its axis 1041, the orifice 104b has a dimension d which is characteristic of the section of said orifice.

In a plane perpendicular to its axis 1351, the pin 135 has a dimension $d_b$ which is characteristic of the section of said pin.

The dimension $d_b$ of the pin 135 is substantially smaller than the dimension d of the orifice 104b in the acrylic pane 10b.

In one exemplary embodiment, the orifice 104b and the pin 135 have a circular cross section having respective diameters of d and $d_b$.

The length L of the pin 135 is such that said length is between a minimum length necessary to hold the acrylic pane in place in the acrylic window pane retainer-frame assembly when said acrylic pane is subjected to significant deformation, for example as a result of an impact, and a maximum length such that a first end 1352 of the pin 135, the one closest to the bearing face 121 of the frame 12, is not in contact with said bearing face of said frame.

In one exemplary embodiment, the pin 135 and the acrylic window pane retainer 13b are two separate elements joined together, for example at a second end of the pin opposite the first end 1351.

In another exemplary embodiment, the pin 135 and the acrylic window pane retainer 13b are made as one piece, with the second end of the pin being integral with the first face 131b of the acrylic window pane retainer 13b.

Preferably, the acrylic window pane retainer 13b and the pin 135 are produced from a metal, for example by machining.

Advantageously, in order to protect an edge of the orifice 104b in the acrylic pane 10b from damage which could be brought about by the pin 135 being inserted and extracted and/or when said pin moves in the orifice 104b as a result of a deformation of the pane 10b, the orifice 104b in the pane 10b has a hollow insert 105. In this respect, the design of the acrylic pane 10b is identical to that of known acrylic panes.

The insert 105 has a cylindrical body 1051, the length of which is substantially the same as the thickness of the acrylic pane 10b, of axis 1054 coincident with the axis 1041 of the orifice 104b, and a collar 1052, at the upper end 1053 of the body, which is positioned next to the acrylic window pane retainer 13b.

The collar 1052 has a cylindrical shape with an axis coincident with the axis 1054 of the cylindrical body 1051 and passing through the cylindrical body-collar assembly is an orifice of sufficient section for the pin 135 to pass through it.

The insert 105 is preferably made of metal, such as stainless steel, for example, and is advantageously held in place in the orifice 104b by adhesive bonding.

Figure 5:
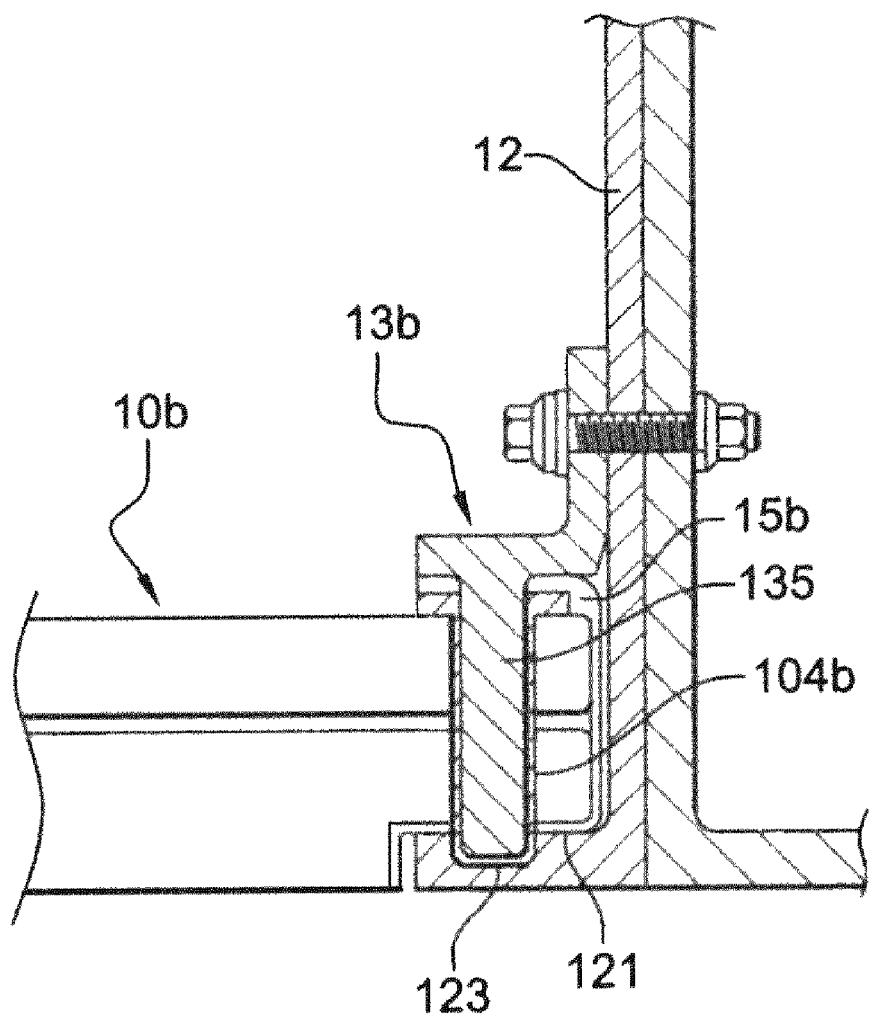
FIG. 5 shows a cross-sectional view of an assembly of a pane of the organic type on an aircraft structure in accordance with an aspect of the disclosed embodiments.

In a variant embodiment as illustrated in FIG. 5, in order to increase the resistance of the pin 135 to the stresses generated by the deformation of the acrylic pane 10b and thus better hold the acrylic pane 10b in place in the acrylic window pane retainer-frame assembly, the frame 12 has, on the bearing face 121, a blind hole 123, which does not open to the outside of the aircraft, facing the orifice 104b in the acrylic pane 10b for taking the first end 1352 of the pin 135.

In this variant, the pin 135 has a length L such that the pin enters the hole 123 without being in contact with the bottom of said hole.

The aircraft according to one embodiment is thus equipped, on an original unmodified frame 12, either with an original or replacement glass pane 10a or with an original or replacement acrylic pane 10b by means of a window pane retainer 13a, 13b suitable for each variety of pane.

In order to replace a pane of the first type with a pane of the second type, for example to replace a mineral pane with an acrylic pane, or vice versa, a first step consists in removing the window pane retainer from its position on the frame, having already removed the fastening elements holding the window pane retainer on the frame.

In a second step, the installed pane is removed from the frame so that the opening made in the structure is exposed.

In a third step, the replacement pane is placed on the structure.

Said replacement pane is positioned in the opening made in the structure on the frame so that the first face of the pane rests on the bearing face of the frame.

In a fourth step, the replacement pane is fastened to the frame by means of the window pane retainer of which the model is specific to said pane.

The window pane retainer specific to the replacement pane is arranged so as to cover the internal peripheral rim of the replacement pane and so that the through-openings made in the window pane retainer coincide with through-openings made in the frame in order to take the fastening elements and lock the pane between the frame and the window pane retainer.

Advantageously, the fastening elements of the window pane retainer have the same shape and location as the fastening elements of the window pane retainer of the first type.

Thus, by virtue of the aspects of the disclosed embodiments, a pane of one type can easily be replaced with a pane of another type in the aircraft, taking less time in the process, which reduces the downtime of the aircraft while improving its modularity.

The invention claimed is:

1. An aircraft comprising:
    at least one windshield pane of the organic type held in place by a window pane retainer fastened to a frame of a structure of said aircraft, said at least one windshield pane interposed between a first face of the frame and a first face of the window pane retainer wherein:
    the frame has no through-holes opening to the outside of the aircraft for fastening the pane, the window pane retainer is fastened to the frame by fastening elements, inside the aircraft, passing through the through-holes in the frame, and the window pane retainer has pins distributed on the first face, each pin having an elongate shape and engaging in an orifice passing through the pane in a thickness of said pane.

2. The aircraft according to claim 1, wherein each pin has a length between a minimum length necessary to hold the pane in the window pane retainer-frame assembly in the event of deformation of the pane and a maximum length such that a first end of each pin, the one closest to the first face of the frame, is not in contact with said first face of said frame.

3. The aircraft according to claim 1, wherein the frame has, on the first face, a blind hole facing the orifice in the pane.

4. The aircraft according to claim 1, wherein the pins and the window pane retainer are produced as one piece.

* * * * *